(12) United States Patent
Battani

(10) Patent No.: US 7,926,416 B2
(45) Date of Patent: Apr. 19, 2011

(54) APPARATUS FOR RAPID COOKING OF EDIBLE PASTA

(75) Inventor: Biagio Battani, Milan (IT)

(73) Assignee: Acanto S.R.L., Milan (IT)

( * ) Notice: Subject to any disclaimer, the term of this patent is extended or adjusted under 35 U.S.C. 154(b) by 633 days.

(21) Appl. No.: 11/629,169

(22) PCT Filed: Jun. 7, 2005

(86) PCT No.: PCT/IB2005/001813
§ 371 (c)(1),
(2), (4) Date: Dec. 11, 2006

(87) PCT Pub. No.: WO2005/120310
PCT Pub. Date: Dec. 22, 2005

(65) Prior Publication Data
US 2008/0060527 A1      Mar. 13, 2008

(30) Foreign Application Priority Data

Jun. 10, 2004    (IT) .............................. MI2004A1156

(51) Int. Cl.
*A47J 27/00* (2006.01)
(52) U.S. Cl. ................... 99/330; 99/403; 99/407
(58) Field of Classification Search ............ 99/330, 99/355, 407, 352, 403, 353, 356
See application file for complete search history.

(56) References Cited

U.S. PATENT DOCUMENTS

| | | | | | |
|---|---|---|---|---|---|
| 1,383,886 | A | * | 7/1921 | Webb, Sr. ..................... | 181/234 |
| 3,667,373 | A | * | 6/1972 | Sicher et al. .................... | 99/407 |
| 3,884,088 | A | * | 5/1975 | Bertozzi et al. ............... | 74/84 R |
| 3,944,678 | A | | 3/1976 | Pratolongo | |

(Continued)

FOREIGN PATENT DOCUMENTS

EP        1 133 249  B1     10/2003

(Continued)

*Primary Examiner* — M. Alexandra Elve
*Assistant Examiner* — John Wasaff
(74) *Attorney, Agent, or Firm* — Sughrue Mion, PLLC

(57) ABSTRACT

A machine for rapid cooking of pasta includes: a measuring device (A) to deliver a predetermined amount of pasta and insert it into a steam cooking chamber (B) equipped with an inlet and an outlet ball valves (40, 28) placed respectively at its upper and lower ends: an expansion chamber (C), where the cooked food leaving the cooking chamber (B) is conveyed: at the base of this chamber there being provided a lid (62) adapted to pour the food into a dish (76): a silencing-steam abating device (D) installed above the expansion chamber, a boiler (E) for the production of pressurized hot water with low evaporation index, which makes it possible to maintain the cooking chamber (C) at a stable temperature and with minimum gradient between the base and top, and a drive mechanism which synchronizes and restrains the movement of the intercepting and distributing organs of the machine.

21 Claims, 16 Drawing Sheets

U.S. PATENT DOCUMENTS

| | | | | |
|---|---|---|---|---|
| 4,143,725 | A | * | 3/1979 | Gaubert ............... 177/123 |
| 4,543,878 | A | | 10/1985 | Luchetti |
| 4,718,331 | A | | 1/1988 | Ansaloni et al. |
| 4,732,080 | A | | 3/1988 | Vita |
| 4,803,916 | A | * | 2/1989 | Tacconi ............... 99/352 |
| 4,803,917 | A | * | 2/1989 | Barbieri ............... 99/356 |
| 4,869,160 | A | * | 9/1989 | Pratolongo ............ 99/330 |
| 5,010,806 | A | * | 4/1991 | Narcisi et al. ........... 99/357 |
| 5,033,364 | A | | 7/1991 | Narcisi et al. |
| 5,165,331 | A | * | 11/1992 | Hayashi et al. .......... 99/450.2 |
| 5,172,627 | A | | 12/1992 | Narcisi et al. |
| 5,361,682 | A | * | 11/1994 | Crolla ............... 99/352 |
| 6,063,421 | A | * | 5/2000 | Barravecchio ............ 426/231 |
| 6,360,652 | B1 | * | 3/2002 | Cusenza et al. .......... 99/330 |
| 6,663,907 | B1 | | 12/2003 | Pratolongo |
| 6,843,165 | B2 | * | 1/2005 | Stoner ............... 99/295 |
| 2002/0178932 | A1 | * | 12/2002 | Cai ............... 99/516 |

FOREIGN PATENT DOCUMENTS

| | | |
|---|---|---|
| IT | 1168271 | 5/1987 |
| IT | 1201339 | 1/1989 |
| IT | 1212126 | 11/1989 |
| IT | 1218100 | 4/1990 |
| IT | 1218101 | 4/1990 |
| IT | 1221703 | 7/1990 |

* cited by examiner

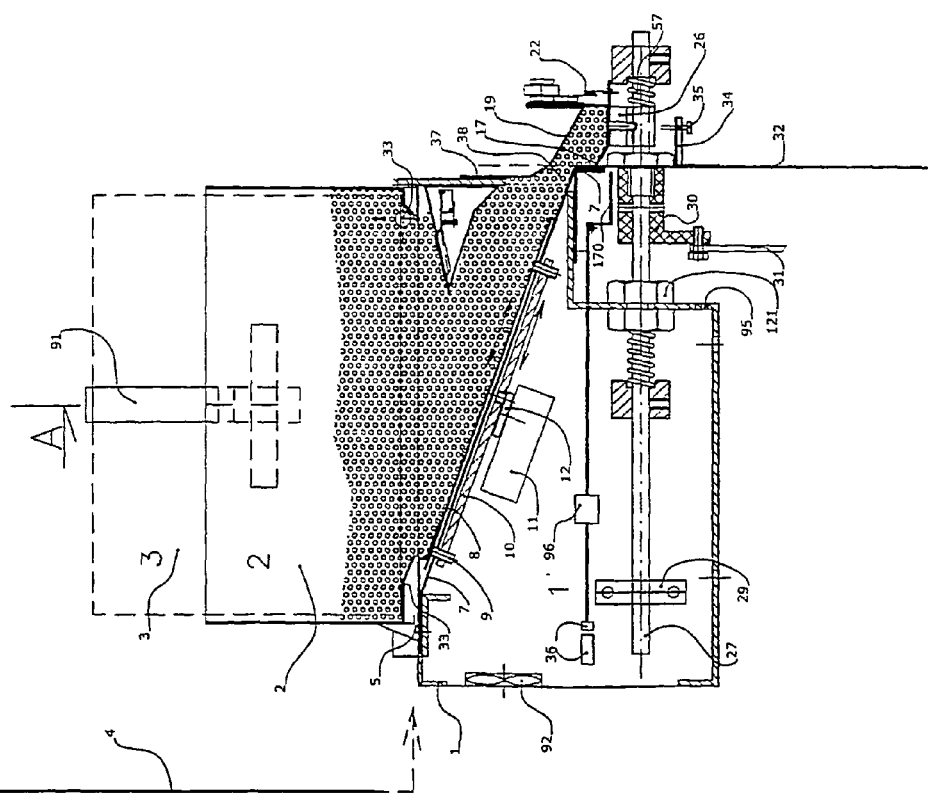

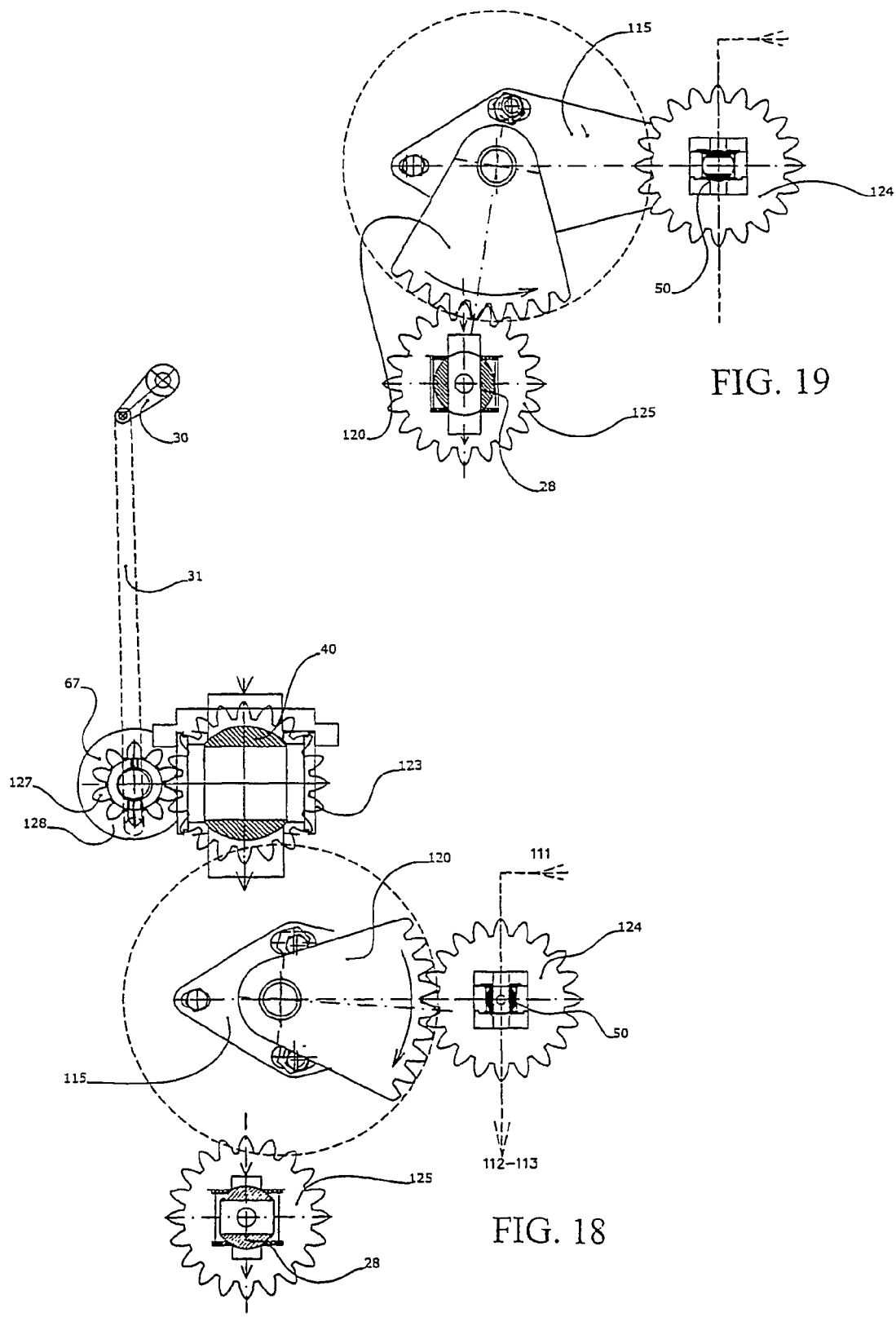

APPARATUS FOR RAPID COOKING OF EDIBLE PASTA

BACKGROUND OF THE INVENTION

1. Field of the Invention

This invention refers to a machine for the rapid cooking of dry or pre-cooked pasta, in particular spaghetti, bucatini and the like.

2. Description of Related Art

As it is generally known, e.g. from EP 1 133 249, the preparation process of a predetermined amount (batch) of pasta takes place as follows:

A measured amount of pasta to be inserted in a cooking chamber is withdrawn from a pasta container. After inserting the pasta, high temperature pressurized water (155° C., 5 atm) is inserted into the cooking chamber. The pasta remains in the cooking chamber for a variable time (40/60"), chosen to suit the type of spaghetti used, after which it is discharged in an expansion chamber.

The product which reaches the expansion chamber is composed of the pasta which, although subjected to the action of the high temperature water, must still complete its cooking and be softened by absorbing water; for this purpose the remaining of the condensate which forms during the expansion phase in the same tank is sufficient.

After a few seconds the pasta is discharged into a dish where it completes the softening process also absorbing the condiment to be added.

Machines for the cooking of spaghetti and dry pasta in general, composed of a distributor of dry pasta, a high pressure cooking chamber and a final decompression and distribution chamber are known. These apparatuses have a number of limits and drawbacks which as a matter of fact have limited their diffusion.

The main drawbacks of the known machines are shortly discussed hereinbelow.

The distributor of dry pasta is subject to frequent malfunctioning caused by the difficulty of measuring predetermined mounts of pasta and delivering them to the underlying cooking chamber.

There is not uniformity in the cooking of a same amount of pasta due to the different temperature levels which form between the base and top of the cooking chamber; this being also due to the phenomena which accompany each expansion phase of the steam which take place at each decompression phase of the chamber.

Further malfunctionings are due to the incomplete discharging or imperfect emptying of the cooking chamber, with formation of burnt or decomposed residues then traceable in the following portions of pasta being cooked.

Other drawbacks are caused by the improper ejection of the cooked food from the expansion chamber.

Another problem is due to the presence, in the cooked food, of either a low or an excessive amount of water. Further troubles are caused by the steam emissions in the environment (noise—danger of burns etc.).

BRIEF SUMMARY OF CERTAIN EMBODIMENTS OF THE INVENTION

The object of this invention is to eliminate the drawbacks of the known technique by providing a machine to cook pasta which is efficient, versatile and permits an automated use.

This object is reached in accordance with the invention by the features recited in the attached independent claim 1.

Further advantageous characteristics of the invention appear from the dependent claims.

The apparatus, which permits the rapid cooking of dry or pre-cooked pasta, in particular of spaghetti, bucatini and the like, object of this invention, while structurally simplified as a whole, makes it possible to overcome the problems listed above thanks to the devices used and the innovative functional solutions applied.

This apparatus includes:
- a measuring device which constitutes the means to form the amounts of pasta;
- a steam cooking chamber in which the amounts formed by the measuring device are inserted, the cooking chamber being equipped with two ball valves (inlet, outlet) placed respectively at its upper and lower ends;
- an expansion chamber where the cooked food leaving the cooking chamber is conveyed; at the base of the expansion chamber there is a lid that will pour the food into a dish;
- a silencing-noise abating steam device installed above the expansion chamber;
- a boiler for the production of pressurized hot water with low evaporation index, with strong vertical development, in order to form a convection system which makes it possible to maintain the cooking chamber at a stable temperature with minimum gradient between the base and top; and
- a drive mechanism which synchronizes and restrains the movement of the intercepting and distributing organs of the machine.

BRIEF DESCRIPTION OF THE DRAWINGS

In the following description the characteristics and advantages offered by the machine according to the invention are disclosed with reference to non limiting embodiments of the invention shown in the attached drawings, in which:

FIG. 1B' is a detail of the cooking chamber of FIG. 1B;

FIG. 1B" is a view in plan according to the plan of section XX-XX of FIG. 1B showing a device for the control the regular descent of the pasta in the cooking chamber;

FIG. 1D' is a partial view in cross-section according to the plan of section D'-D' of FIG. 1D;

FIG. 1D" illustrates a plan view and the profile of a sector of the silencer of FIG. 1D.

FIG. 2 is a side view sectioned according to the plan of section II-II of FIG. 1A illustrating the distributing-measuring device of dry pasta, in which an industrial or package of pasta has been drawn with dotted lines;

FIGS. 2A, 2B are two enlarged details of FIG. 2;

FIGS. 17, 18, 19 show three operating positions of the drive device of FIG. 13;

DETAILED DESCRIPTION OF EXEMPLARY EMBODIMENTS OF THE INVENTION

Figure 1:
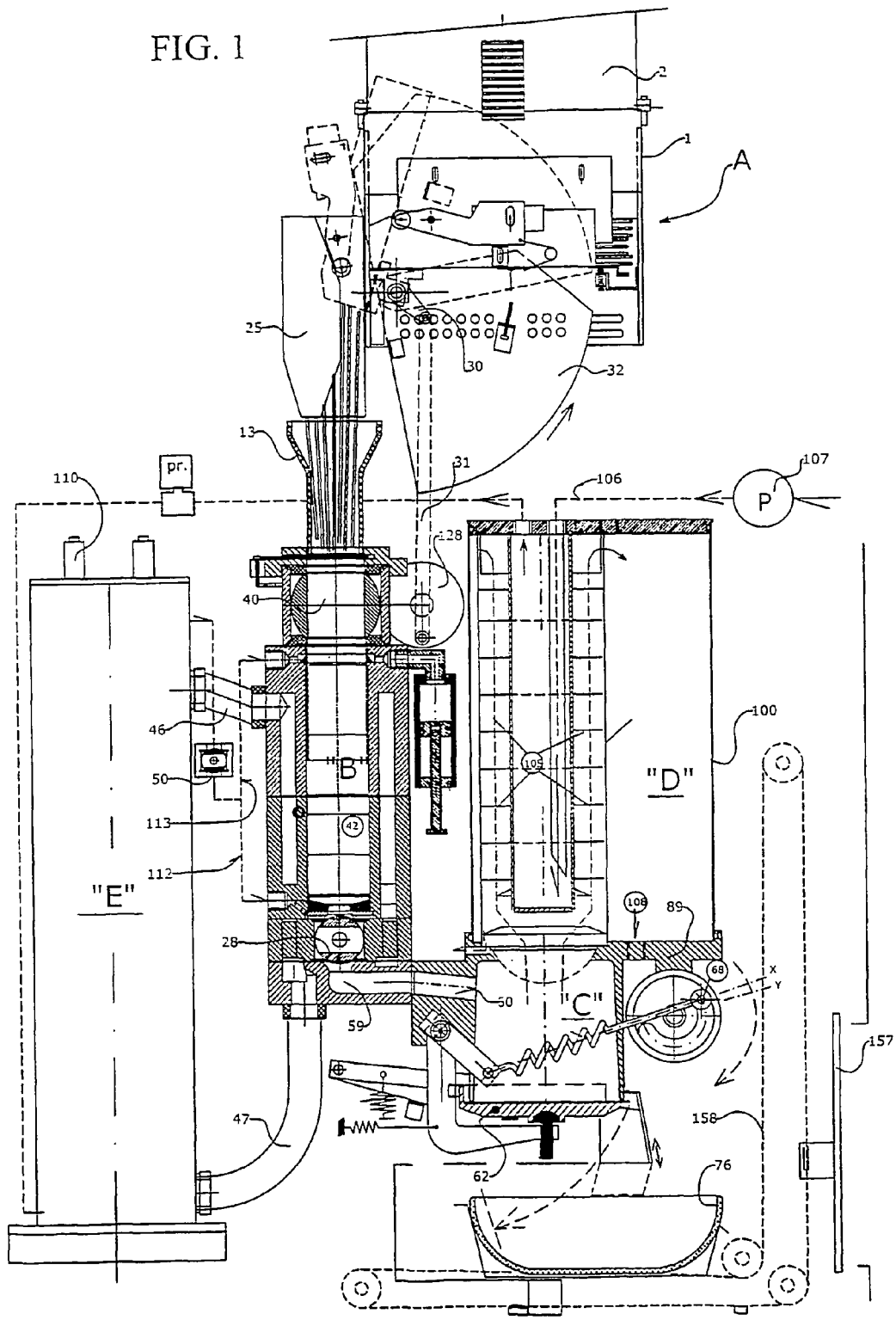
FIG. 1 is a front view, partially in section, of the assembly of the machine according to the invention.

FIG. 1 shows the whole machine for the rapid cooking of pasta, according to the invention. With the aid of the figures the machine for the rapid cooking of pasta according to the invention is described and illustrated as a whole in FIG. 1.

The machine includes:
- a measuring or batching device A to form the batches of pasta;
- a cooking chamber B in which the pasta coming from the measuring device A is steam cooked;
- an expansion chamber C where the cooked food coming from the cooking chamber B is conveyed and expanded;
- a silencing-noise abating steam device D placed above the expansion chamber C;
- a boiler E for the production of pressurized hot water and steam to feed the cooking chamber B; and
- a drive mechanism (not shown in FIG. 1) at the back of the cooking chamber B, which synchronizes and restrains the movement of the intercepting and distributing organs of the machine as will be explained later.

With reference to FIGS. 1A, 2, 2A, 2B, 3, 21 and 22 the operation of the measuring device A is described.

Figure 1A:
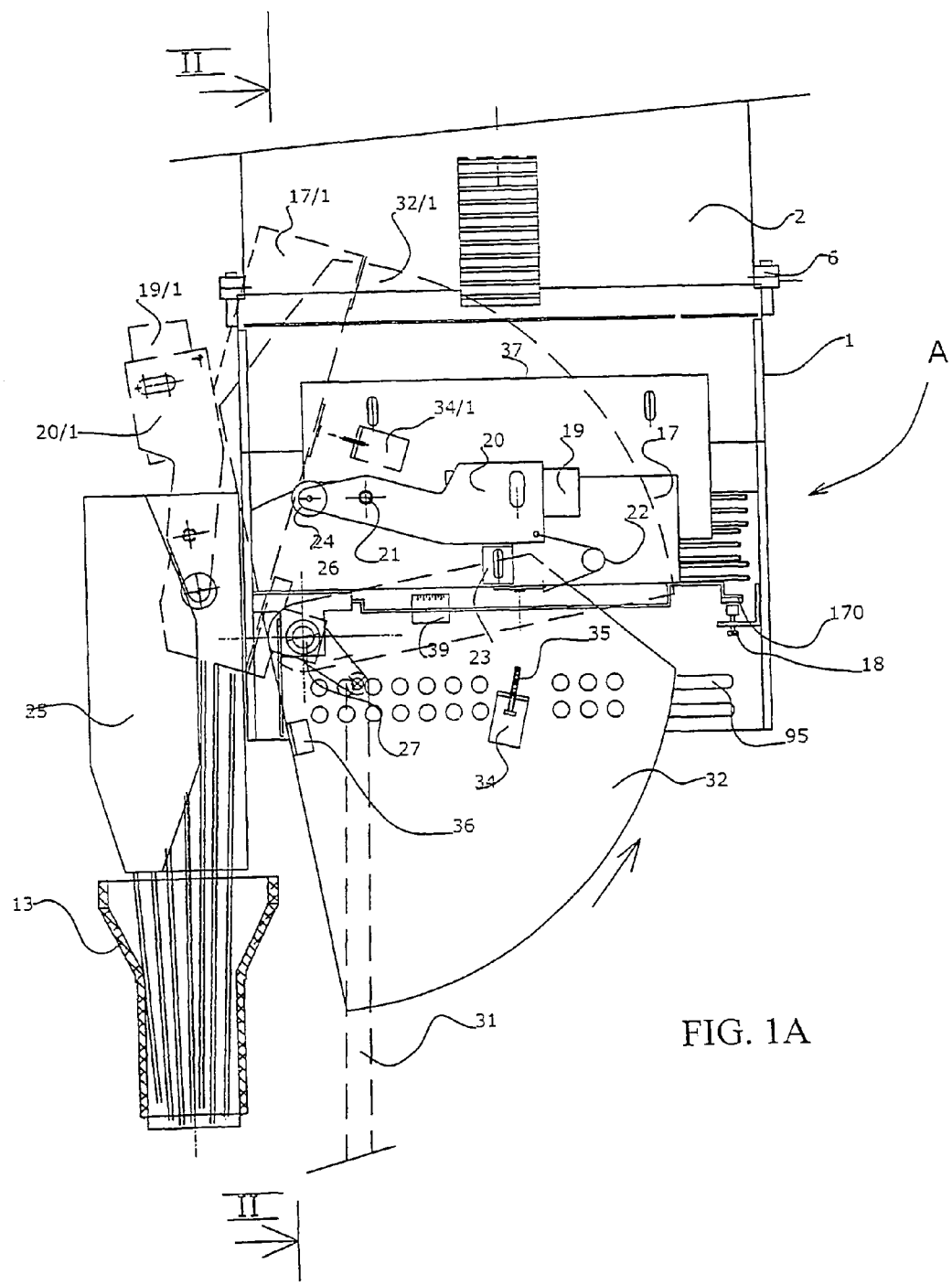
FIG. 1A is an enlarged detail of FIG. 1 illustrating the measuring unit.

With reference to FIGS. 1A and 2, the measuring device A, placed at the top of the machine, includes:
- an extractable container 2 suitable to receive an industrial package of pasta 3,
- a hopper 1 suitable to receive the container 2 and convey the pasta to a box batcher 17,
- a descent channel 25 connected of the hopper 1, and
- a funnel 13 disposed under the descent channel to guide the sheaf of spaghetti in free fail towards the mouth of the cooking chamber B.

The extractable container 2 is temporarily closed at the bottom by a separating blade 4 (shown in exploded view in FIG. 2) which is inserted in a special slip guide 5. The container 2 is equipped with 2 guide stakes 6 FIG. 3) which facilitate the insertion on the hopper 1.

The hopper 1 incorporates the components prepared to facilitate the descent of the pasta from the overlying container 2 to the dosing drawer 17. The hopper 1 is equipped with suitable flow switches 33, a fixed inclined base 7 (FIG. 2A) and a movable base 8 laid on the inclined base 7.

The movable base 8 is equipped with two dragging stakes 9 placed on the centre line axis, which, inserted in two slots 88 obtained on the fixed base 7, permit its swinging movement. The two stakes 9 are restrained by a connecting rod 10 driven by a crank gear 12 placed on a geared motor 11. The drive of the crank gear 12 causes an alternative movement of the movable base 8.

On the centre line of the movable base a set of cogged bosses and on the front end a tooth 16 are obtained, these protuberances have the function of causing a moderate thrust on the spaghetti thus sending it towards a descent neck 38 which inserts it in the box batcher 17.

Figure 21:
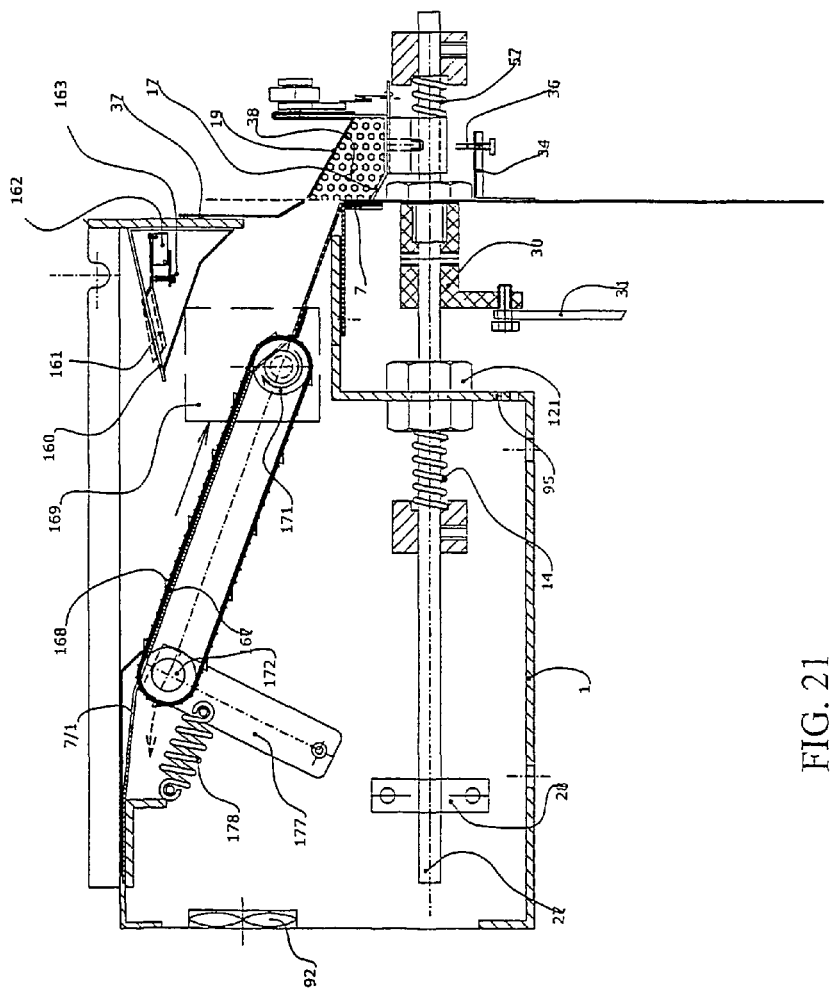
FIG. 21 is a view in section according to the plan of section XXII-XXII of FIG. 21.

FIGS. 21 and 22 show a variant to the above-mentioned pasta conveyance system (movable plane 8 with swinging movement). This variant is suitable for use with reserves of pasta of large consistency and with significant increase of the pressure on the movable base. In this second version, on the fixed base 7/1 specially shaped, slides a belt 167, with a central toothed back 168. The belt 167 is inserted on two rollers 171, 172. The first motive roller 171 is driven by a geared motor 169 and the second duct roller 172 keeps the belt 167 stretched. The second duct roller 172 is hinged on two rotating supports 177 controlled by stretching springs 178.

In both the versions shown in FIGS. 2 and 22 the conveyance of the pasta is controlled by device which will be described below.

This device includes a horizontal shaft 27, inserted in bushes 121 and 29 integral with the hopper 1. The shaft 27 is restrained by a crank 30 placed outside the hopper 1.

The crank 30 is integral with a blade 32 which rotates in a seat formed between the vertical edge of the inclined base 7 and the inlet of the box batcher 17. The blade 32 is pushed against the vertical edge of the inclined base 7 by the action of a spring 14 and by the edge of the box batcher 17. The box batcher 17 is pushed by a spring 57.

On the same shaft 27 is hinged, free, a small block 26 integral with a counterweight 39 (FIG. 1A) and the box batcher 17.

The top of the drawer 17 is partially closed by a press sheet 19 controlled by a spring 22. The press sheet 19 is fixed to a press seat 20 (FIGS. 1A, 2B). The press seat 20 is hinged on the box batcher 17 in point 21 and is controlled by the spring 22 and by an adjustable limit stop 23.

When the box batcher 17 is rotated up to position 17/1 (shown in section in FIG. 1A) a roller 24 placed on the front end of the press seat 20 comes into contact with the descent channel 25 and, overcoming the contrast of the spring 22, causes the lifting of the press 19.

A progressive limit stop 18 (FIG. 1A) (spring with supporting spring with screw and container cylinder) placed below the box batcher 17 permits the control of the weight of the food which reaches the box batcher 17 through a device which detects the collimation of the strap 170 projecting from same, with a magnetic contact or other device of current use. The same detection device controls the action of the geared motor 11 (FIG. 2).

The crank 30 is connected to a connecting rod 31. As shown in FIG. 1, the connecting-rod 31 is connected to another crank 128 moved by a pinion as will be explained later. This system permits the consequent rotation of the crank 30 which rotates the shaft 27 and the separating blade 32 fixed to it. In the rotation, the blade 32 is inserted in the sheaf of spaghetti present in the descent neck 38 and, meeting a counter-blade 37 placed at the inlet and above the descent neck 38, closes the descent neck 38, thus preventing the descent of other spaghetti from the hopper 1.

Returning to FIG. 1A, to the blade 32 is fixed a square 34 equipped with a stake with spheroidal head 35. Continuing the rotation of the blade 32, the square 34 will meet an elastic seat 36 (FIG. 2B) placed below the box batcher 17. In this way the box batcher 17 is rotated until the roller 24 (FIG. 1A) placed on the press seat 20 meets the descent channel 25 and, causing the rotation of the press seat 20, raises the press 19 which releases the spaghetti. As a result the spaghetti descends by gravity into the underlying cooking chamber B. The descent channel 25 and the tunnel 13, suitably shaped and arranged, facilitate the insertion of the batch of dry pasta in the underlying cooking chamber.

In the return route, the stake 35 inserted in the elastic seat 36 will return the box batcher 17 until it meets the limit stop 18 and the connecting spring with limited restraint 96. In the continuation of the rotation the stake 35 is released from the elastic seat 36 and the blade 32 returns to the starting point of travel opening the descent neck 38 of the hopper 1.

In the upper part of the hopper 1 a control device is provided which makes it possible to check the reserve of spaghetti remaining in the container 2. As better shown in FIG. 22, this control device includes a movable deflector 160 hinged to the hopper in 162. The deflector 160 is supported by a calibrated spring 164 which pushes it against an upper stop bracket 165. Under the weight of the spaghetti the deflector 160 drops, resting on a second lower oblique bracket 161, where a proximity driven by a magnet 166 anchored to the deflector 160 is placed.

The extractable container 2 has the function of receiving the pasta directly from industrial packages of suitable dimensions. The filling of the container 2 is carried out advantageously and easily by removing it from its seat inside the hopper 1, after having closed it with the special separating blade 4. The container 1 is then inserted connecting it with special springs 91 (FIG. 3) on a previously opened package of food 3. Finally, the container 1 is returned reversed in its seat to form the feed tank of the measuring device A.

To prevent the heat diffused by the hot components of the underlying equipment hitting the food container in the measuring device A, on the wall behind the hopper 1 a fan 92 is placed and on the front wall of the same hopper, slots 95 are positioned in such a way as to remove the flow of convective hot air.

Figure 1B:
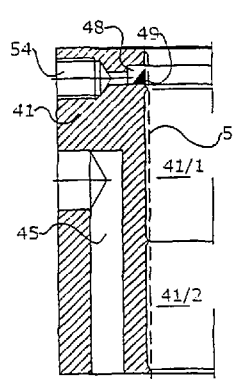
FIG. 1B is an enlarged detail of FIG. 1 illustrating the cooking chamber unit.
Figure 1B:
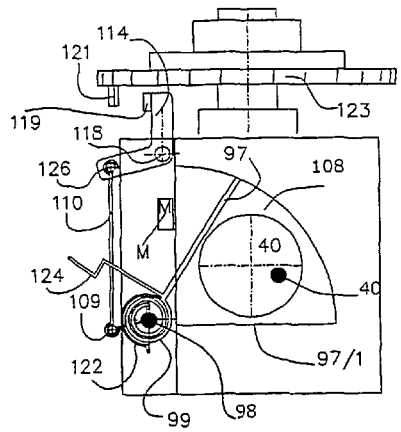
Figure 1B:
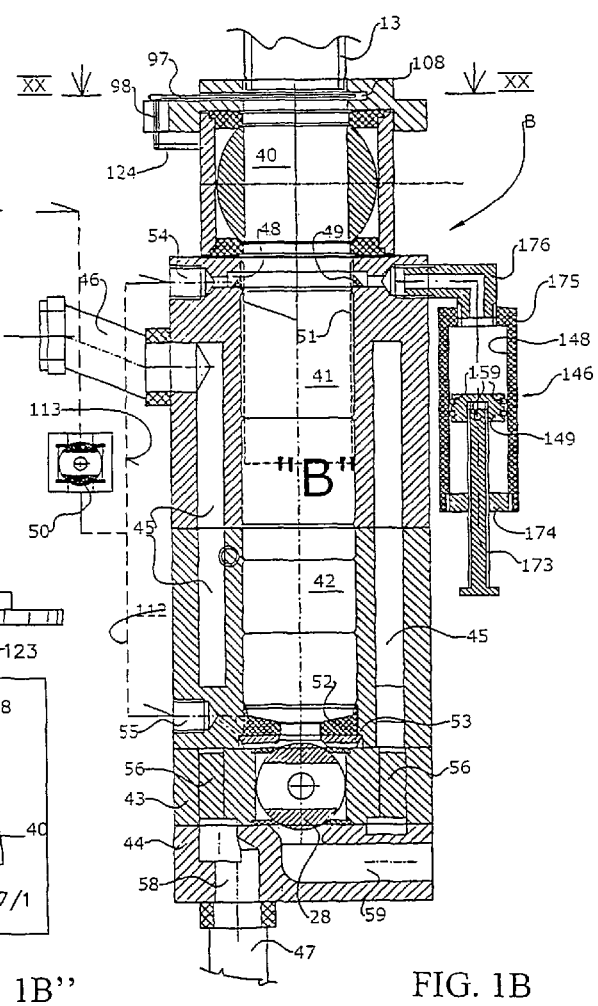

With reference to FIG. 1B, the operation of the cooking chamber B is described.

The cooking chamber B includes an inlet valve 40 and an outlet valve 28.

The descent channel 25 and the underlying funnel 13 collect the spaghetti leaving the measuring drawer 17 guiding it on the inlet of the inlet valve 40 of the cooking chamber B. A testing device is placed at the base of the funnel 13 to check the absence of pasta residues at the inlet of the inlet valve 40.

Figure 20:
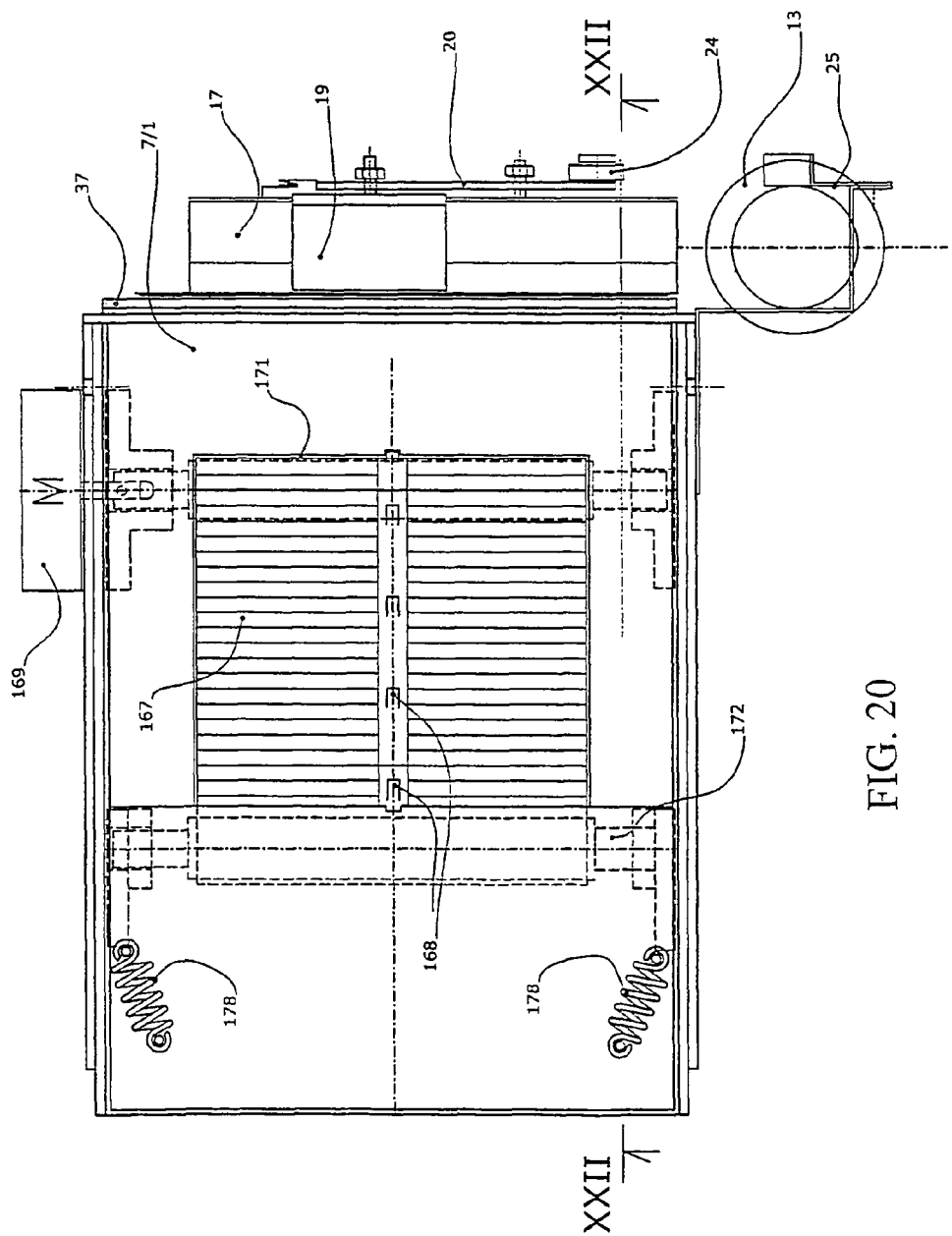
FIG. 20 is a view in plan from the top showing a variant of the distributing-measuring device of FIG. 2.

As shown in FIG. 20, the mechanism of the testing device includes:

a probe 97 composed of a steel wire (FIGS. 20 and 1B) which, fixed to a pin 98, through a spiral spring 99, rotates in a seat 108 obtained on the counter-flange sealing the valve 40;

a second spiral spring 122 which fixes the pin 98 and the probe 97 in rest position (as shown in FIG. 20), and an arm with tang 109 fixed on the same pin 98 and connected by means of a connecting rod 110 to a stake 326 of a lever 114.

The lever 114 is placed at the fulcrum in 118 and is equipped with a vertical arm 119 which is moved by a small block 121. The small block 121 is placed on the cogwheel 123 in position which permits the movement for a brief section of the arm 119 in the rotation phase immediately after the descent of the spaghetti.

The rotation seat 108 of the probe 97 intersects the descent duct of the spaghetti. The movement exerted by the small block 121 on the lever 114 causes the rotation of the probe 97 up to position 97/1 and the rotation of the tang 124 integral with the probe 97 until it meets a detector 'M'. The presence of material in the descent duct of the spaghetti prevents the rotation of the tang 124 and the probe 97, causes the torsion of the spiral spring 99 and prevents the operation of the detector 'M'. At the end of the action of the lever 114, the return spring 122 returns the probe to the initial position.

The cooking chamber 'B' is formed by five bodies assembled and identified in FIG. 1B with the numbers 40-41-42-43-44.

The ball valve 40 forms the inlet of the cooking chamber B.

The hollow body 41 forms the upper part of the cooking chamber. On the inner wall of the hollow body 41 two truncated cone-shaped sectors 41/1-41/2 (FIG. 1B') are formed to limit the contact between the walls and the sheaf of spaghetti inserted for cooking and facilitate the washing action resulting from the emptying under pressure. Concentrically to the cooking chamber B a tubular seat 45 connected to the boiler by means of the ducts 46-47 is obtained. The tubular seat 45 performs the function of heat convector-exchanger.

At the top of the cooking chamber B an annular seat 48 connected with a steam insertion connection 54 is obtained. A ring with trapezoidal section 49 which assures the diffusion of the steam on the whole circumference is inserted in the annular seat 48.

A tubular screen 51 inserted inside the cooking chamber B assures that the diffuser ring 49 remains in seat, improves the spraying of the spaghetti, facilitates the convective movement and improves the washing action of the walls in discharge phase.

The body 42 forms the lower part of the cooking chamber. Also in this sector 42 the walls present a similar conicity. At the lower end of the sector 42 is placed an annular base 52 in PTFE or other anti-adherent material, and a drilled disk 53 with radial and circular hollows prepared to diffuse the steam admitted in by the connection 55 above the outlet valve 28.

The body 43 contains the outlet valve 28 and with suitable peripheral hollows 56 connects the tubular seat 45 of the lower body 42 with connecting hollows 58 communicating with a return duct 47 which leads to the boiler E.

The body 44 has the function of connecting the valve body 43 with the expansion chamber C, by means of a tubular hollow 59, and of establishing the connection between the concentric tubular seat 45 of the cooking chamber B and the return duct 47.

The central section of the cooking chamber B is occupied by the sheaf of spaghetti inserted. The excess volumes, formed by the seats of the truncated cone-shaped crowns, are occupied by the superheated water. The capacity of these sectors is correlated to the amount of water that remains in the pasta, when it is inserted in the expansion chamber C.

To permit a regulation of this remaining water, essential for the final softening of the pasta, a variable extension of the volume of the cooking chamber B is created. The device which makes it possible to realize this prerogative is formed by a hollow body 146 with cylindrical internal seat 148 where a piston 149 equipped with O-rings (OR) 159 is inserted. A threaded shank 173 is fixed axially to the piston 149 and is guided by a threaded bush 174 screwed on the end of the hollow body 146. The shank 173 makes it possible to change the axial position of the piston 149 and consequently to vary the volume of the cylindrical seat 148 connected with the cooking chamber. The described extension chamber is connected with the annular seat 48 of the cooking chamber by means of a connection 176.

Figure 1C:
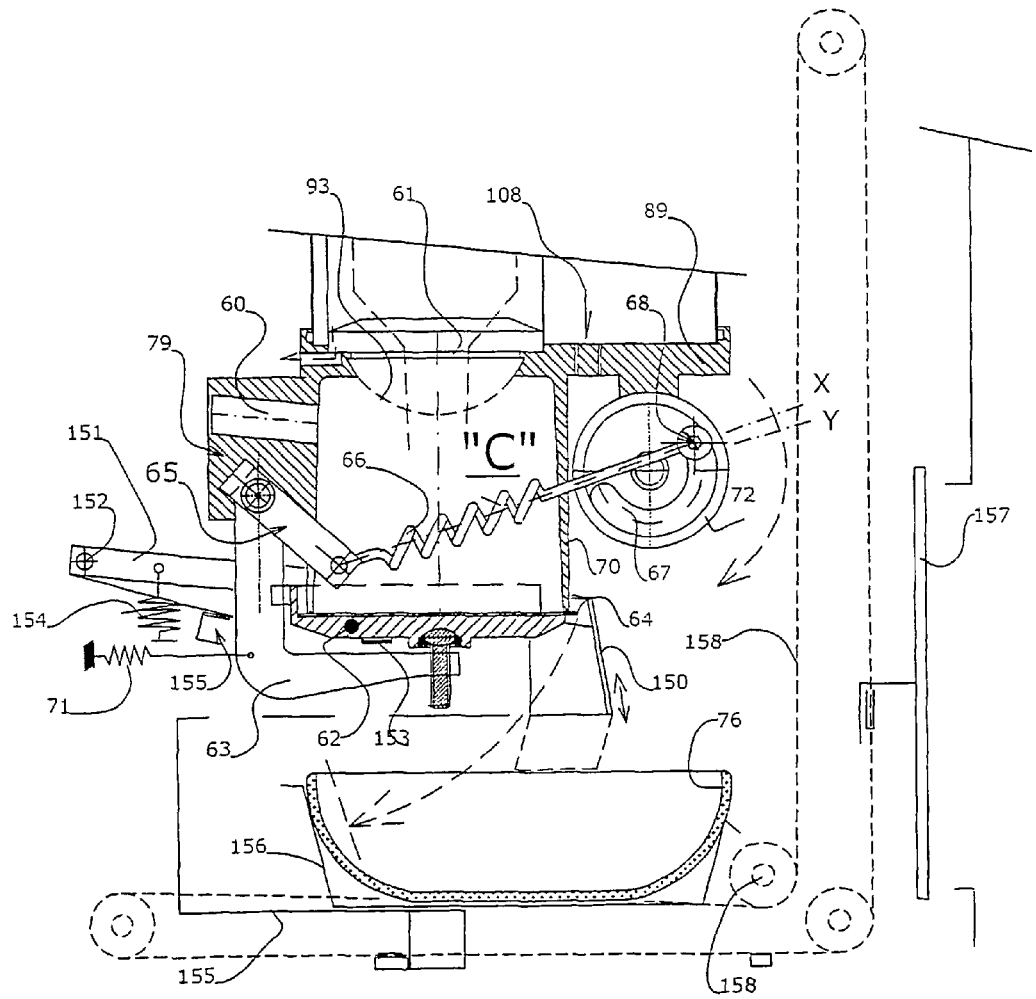
FIG. 1C is an enlarged detail of FIG. 1 illustrating the expansion chamber unit.
Figure 9:
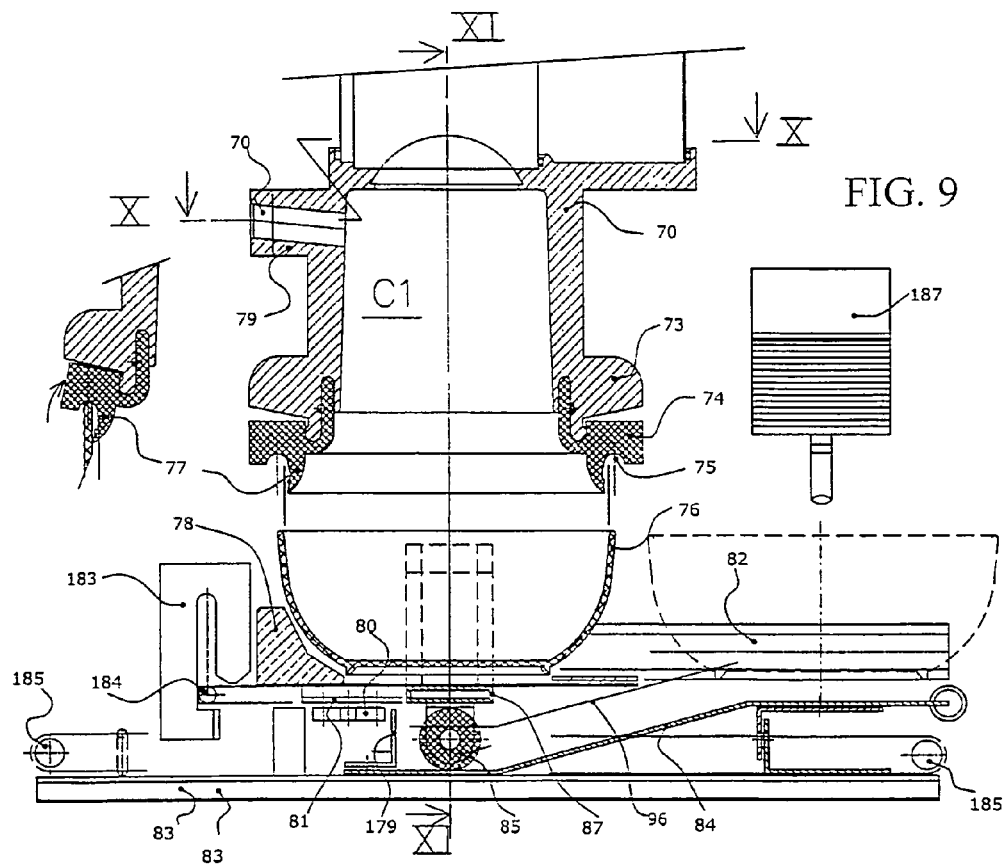
FIG. 9 is a view in section illustrating a variant of the device for the withdrawal of the cooked food coming from the expansion chamber.
Figure 10:
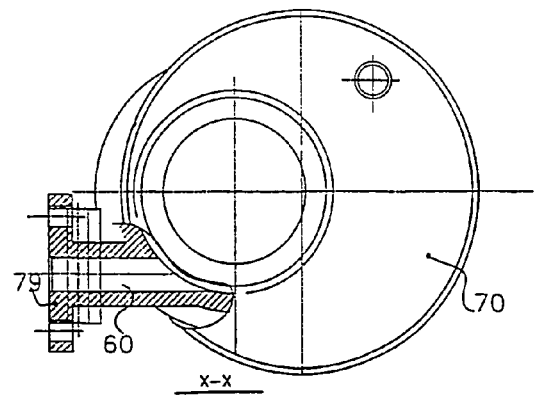
FIG. 10 is a view in cross-section according to the plan of section X-X of FIG. 9.

With reference to FIGS. 1C, 4, 5, 9-12, the operation of the expansion chamber C is described. The expansion chamber 'C' is formed by a drum 70 with a connecting flange 79 (FIG. 1C) in which a discharge duct 60 advantageously placed tangent to the wall of the expansion chamber and with inclination towards the bottom of same is obtained (FIG. 1C,10). The duct 60 connects the expansion chamber C with the duct 59 and the exhaust valve 43 of the cooking chamber B (FIG. 1).

In the upper part of the expansion chamber C an annular flange 89 is obtained which, through a round opening 61, where a semi-spherical filter 93 is inserted, connects same with the silencing-abating device "D", placed at the top.

At the closure of the bottom of the expansion chamber C a lid 62 is placed, equipped with:
- a drive arm 63,
- a bottom 64 with tank in anti-adherent material,
- a crank 65 driven by a spring with function of connecting rod 66.

The spring 66 is driven by a connecting rod with movable pin 67 (FIG. 4) placed in a crankcase 72 (FIG. 5), with button 68 and nut 94 sliding inside a round hollow 69 obtained in the crank seat 72.

The described device, thanks to the action of the spring 66, advantageously assures a constant closing pressure on the lid 62. The action of the springs 66 and 71 assures a rapid opening of the lid 62. This takes place when (FIG. 1C) the button 68 of the crank leaves the position X and surpasses the dead point Y, releasing the connecting rod with spring 66.

The detachment from the walls and the ejection of the food located in the expansion chamber C are facilitated by the centrifugal force and by the acceleration exerted on the lid 62. The tangent and downward position of the outlet duct 60 makes the food rest on the lid 62 and not remain glued on the vertical walls of the expansion chamber C.

A cylindrical sector 150 in anti-adherent material is supported by an arm 151 placed at the fulcrum in 152, supported on a bracket 153, fixed to the lid 62. The arm 151 is contrasted by a spring 154. The cylindrical sector 150 has the function of containing the projections of liquid and food.

The insertion and withdrawal of the dish 76 is facilitated by a movable deck 155 on which a plate seat profile 156 is obtained. The operation of a lid with coulisse 157, placed to protect the supply compartment, by means of a system with cables and pulleys 158, causes the transfer of the dish 76 to the food supply and withdrawal positions.

A variant to the ejection system described above may be advantageously adopted to simplify the assembly, if it is possible to use special dishes. This variant is shown in FIGS. 9-11.

In this version, the expansion chamber 'C/1' presents the lower edge 73 equipped with a casket 74 in elastic material, with a striker seat 75 where the upper edge of the dish 76 penetrates. The thrust of the dish 76 exerts a torsion on the external body of the gasket 74. In this way the sealing lip 77 is thrust against the internal wall of the dish.

The pressure inside the expansion chamber C/1, caused by the steam leaving the cooking chamber B, increases the thrust on the sealing lip 77 increasing its adherence to the wall and the seal. In this case the dish 76 forms an extension of the expansion chamber C/1, advantageously increasing its volume.

Figure 11:
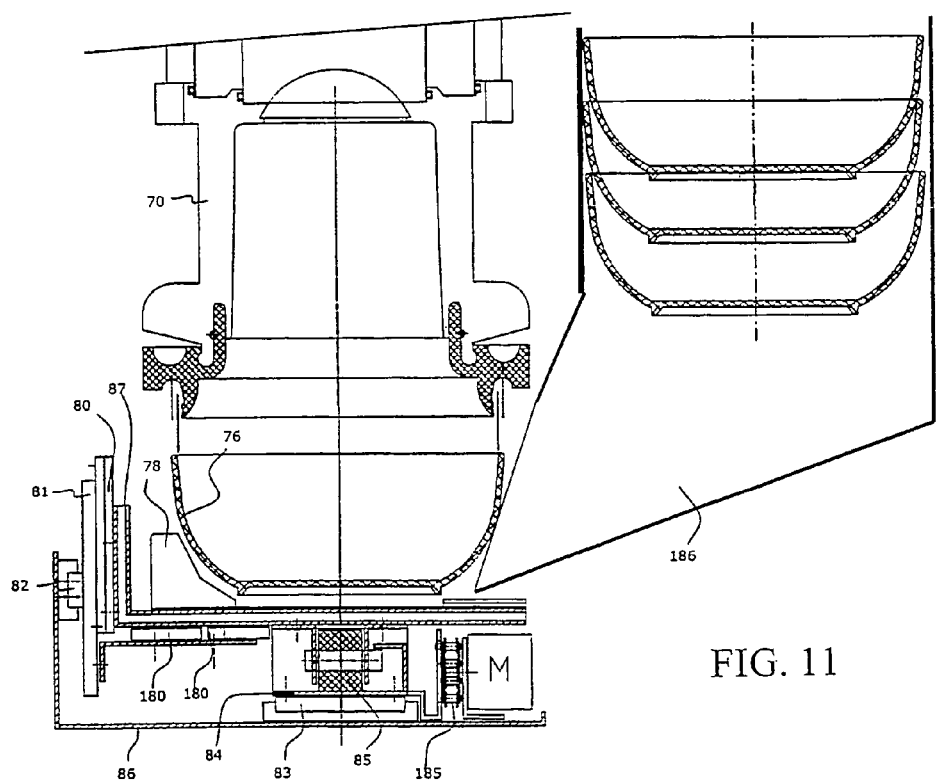
FIG. 11 is a view in axial section according to the plan of section XI-XI of FIG. 9.
Figure 12:
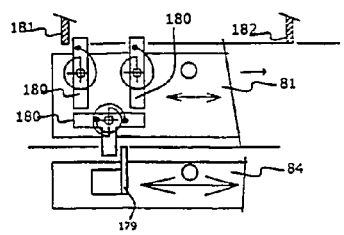
FIG. 12 is a view in plan, illustrating some release levers (180) constrained on the sliding plate 81 (FIG. 9,11)

A drive system of the dish seat, to be considered unbinding example, is shown in FIGS. 9, 11, 12.

The base of the seat dish 78 is fixed to a bracket 87 which slides on the vertical linear guide 80. The guide 80 is fixed to a vertical plate 81 which in turn slides on a second horizontal linear guide 82. Below the bracket 87 is placed a free wheel 85 laid on a shaped cursor 84, which is made slide on a third linear guide 83 by a drive system with chain with towing pin 185 or other drive system in current use.

The transmission chain 185 with towing pin moves the shaped cursor 84. The cursor 84, through a bracket 179, in turn tows the seat dish deck 78 engaging some release levers 180, until it brings it to the axis of the expansion chamber C/1 where it stops released by the striker 181 and stopped by the restraint guide 183 where the pin 184, integral with the bracket 87, is inserted. The further advancement of the cursor 84 raises the base of the seat dish 78 and causes the insertion of the dish 76 in the seat of the gasket 74. The return movement of the cursor 84 causes the descent of the dish 76 to the initial position and subsequently transfers it to the withdrawal (start) position where the limit stop 182 is placed.

A dish dispenser 186 (FIG. 11) driven by the same chain 185 may be interlocked to the system.

Figure 1D:
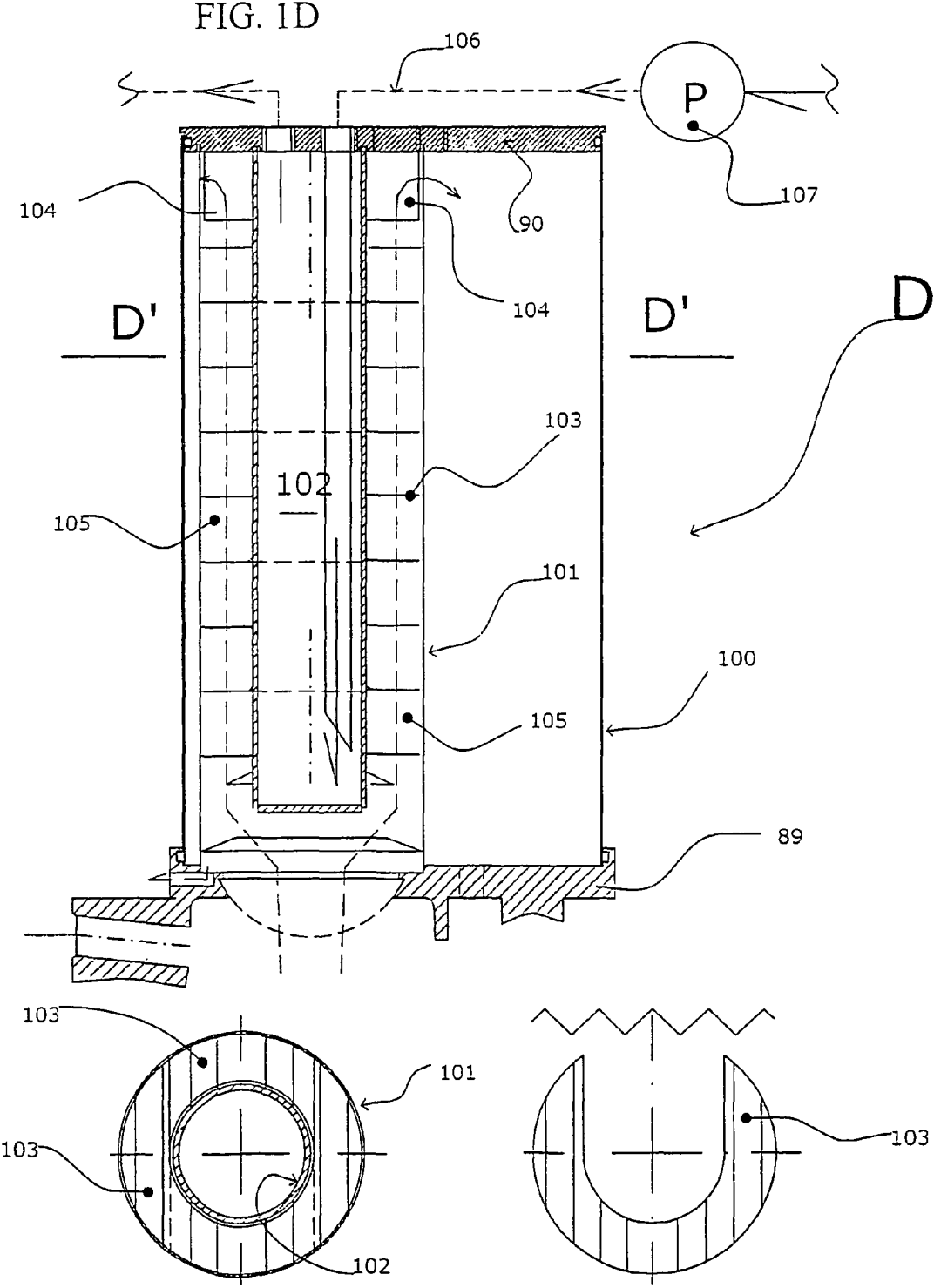
FIG. 1D is an enlarged detail of FIG. 1 illustrating the silencing-steam abating unit.
Figure 3:
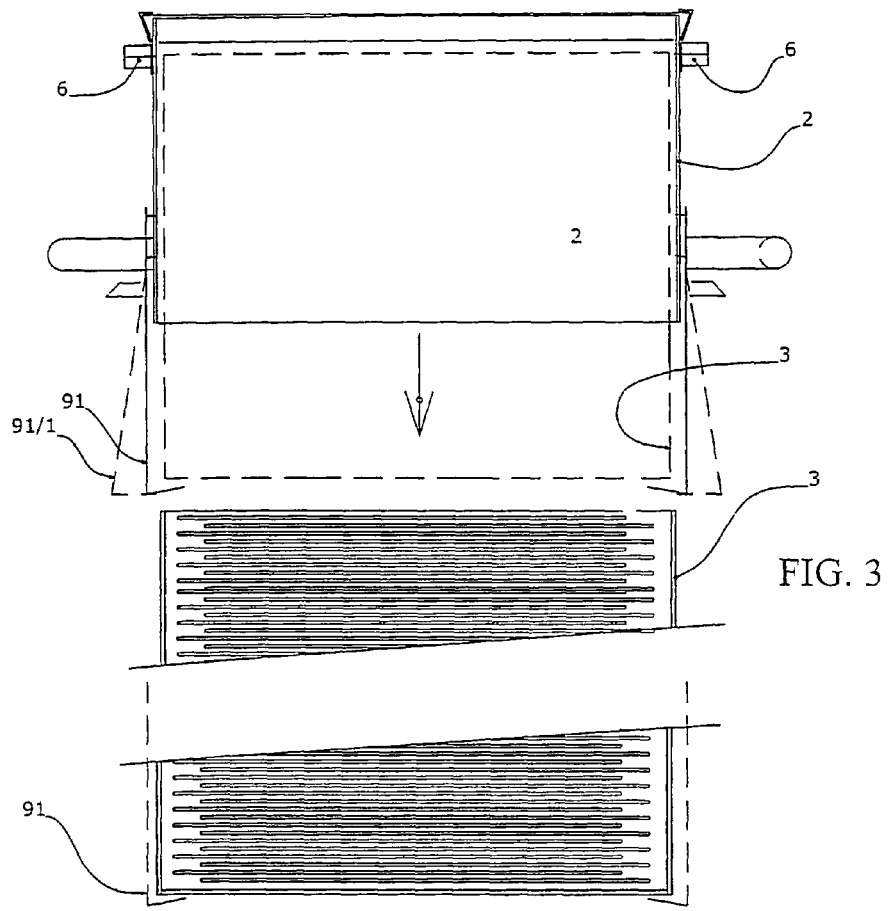
FIG. 3 is a view in section according to the plan of section III-III of FIG. 2, in which the industrial package of pasta is shown interrupted.
Figure 5:
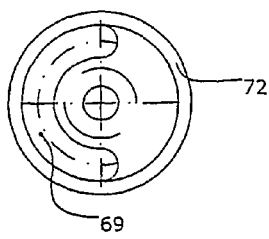
FIG. 5 is a view in plan of a crank seat according to plan V-V of FIG. 4.
Figure 4:
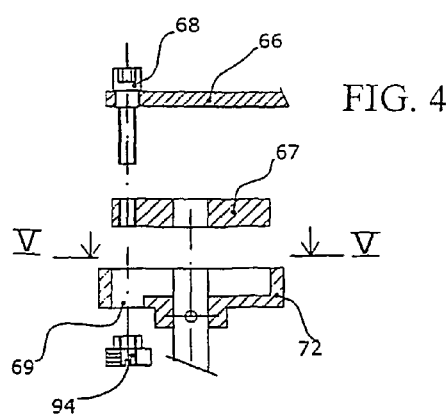
FIG. 4 shows in section and exploded view a connecting rod with movable pin to drive the measuring lid.

With reference to FIGS. 1D, 1D' and 1D", the silencing and steam-abating device D is described.

The silencing and steam-abating device 'D' is inserted on the annular flange 89 of the expansion chamber 'C' and is formed by a tubular body 100 fixed with seal between the lower flange 89 and a round flange 90 placed at the top.

A second tubular body 101, placed inside the first one 100, in offset position and fixed in the same way, presents in the upper part some slots 104 which connect the chambers of the two tubular bodies 101-100.

A drum 102 (FIG. 1D') contains on the exterior perimeter some diaphragm horseshoe-shaped corrugated sheets 103 (FIG. 1D") placed in opposite alternate phases to create a labyrinth configuration in the silencer. The drum 102 receives the water coming from a feed circuit 106 and from a pump 107 which then flows into the boiler 'E'.

The steam and noise coming from the expansion chamber C expand into the internal chamber of the tubular body 101 crossing the silencing chambers 105 bordered by the sheets 103. Then steam and noise flowing from the upper slots 104 reach the chamber of the external body 100 of the silencer.

The route through the labyrinth 105 causes the abatement of the noise generated by the expansion of the steam leaving the cooking chamber B and facilitates the steam condensation with heat transfer to the drum 102. The further expansion in the chamber of the external body 100 brings the pressure and temperature of the residual steam to non-dangerous levels and the residual steam can therefore be inserted in the discharge duct 108 to be discharged towards the exterior. With reference to FIG. 1, the operation of the boiler E is described.

The boiler 'E', with reduced section, has a pronounced vertical development. It is connected at the base and top with the tubular seat 45 concentric to the cooking chamber B by the ducts 46-47 and thus assures a convective movement which keeps the temperature of this cooking chamber stable. The minor vertical development of the tubular seat 45 and its larger section advantageously make it possible to limit the temperature rise between the top and base of the cooking chamber B.

The superheated water, withdrawn at the top of the boiler 111 and cut by the valve 50, is inserted in the cooking chamber B by two ducts 112-113.

To assure the minimum steam development inside the boiler, a drain valve 110 is placed at the top, which, suitably calibrated, will intervene at each filling cycle at the prefixed pressure eliminating the steam that has formed.

With reference to FIGS. 13-19, the operation of the drive device of the mechanisms for cut of fluids 40, 28, 50 and of the measuring device A is described.

As a precise positioning of the inlet valve 40 is indispensable when it is in 'open' and 'closed' phase, a system is used to advantage which permits a micrometric tuning of the rotation phases and of the stop positions of this valve 40. This mechanism makes it possible to establish a perfect engagement position even if slight dimensioning errors are present on the assembled components.

The drive device includes a supporting plate 115 which incorporates two guide bushes 61-269 for the respective shafts 'd' and 'b'. The supporting plate 115 also contains three oval slots 116 -140 which permits its anchorage to the body of the cooking chamber B.

A toothed round sector 120 is fixed to the droving shaft 'd'. The driving shaft 'd' is inserted in the bush 61. The goniometric position of the toothed sector 120 is controlled by the detection devices in common use placed on the extension of the driving shaft 'd'.

The shape and number of the teeth of the toothed sector 120 are determined to permit the coupling and release of the cogwheels placed on its rotation route after these have made a rotation of 180°. To facilitate the engagement, on the first and last tooth of the toothed sector 120 the circumference of external parting is suitably modified; reducing its addendum.

Three cogwheels 123-124-125—with cog ratio Z1/Z2 referred to the sector 120 equal to 2/1, are respectively fixed as follows:

the cogwheel 123 is fixed to the shaft 'a' of the valve 40 placed at the inlet of the cooking chamber B;

the cogwheel 124 is fixed to the shaft 'b' of the valve 50 placed on the pipeline which carries the superheated water from the boiler E to the cooking chamber B:

the cogwheel 125 is fixed to the shaft 'e' of the valve 28 placed on the outlet of the cooking chamber B.

Figure 15:
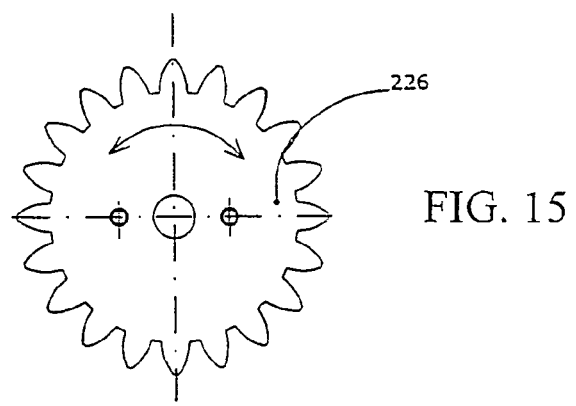
FIG. 15 shows a gear with cogwheel of the drive mechanism of FIG. 13, with an exploded view of a constraining-cogwheel flange.
Figure 16:
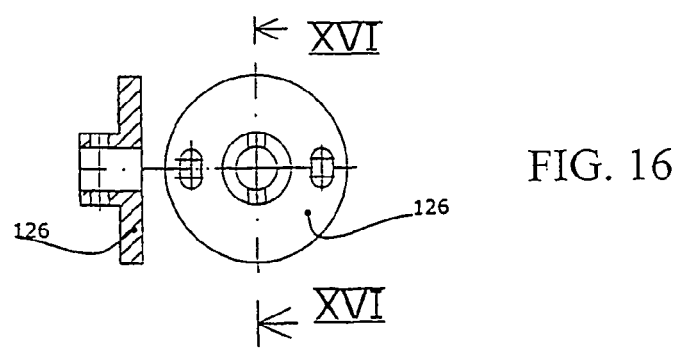
FIG. 16 is a view in section of the flange according to the plan of section XVI-XVI of FIG. 15.

Each of these cogwheels, exemplified in FIGS. 15 and 16, is composed of its own cogwheel 226 which contains two tapped seats and a flange 126, to be fixed on the respective shaft with a plug and which contains two peripheral oval slots which permit the goniometric regulation and the assembly with the cogged wheel. The seats of the cogwheel 226 have an identical centre distance to the slots placed on the relevant restraining flange 126.

The rotation before or after the gearing, conceded by the clearance of the slots, makes it possible to precisely define the engagement point of the same cogwheel.

Figure 14:
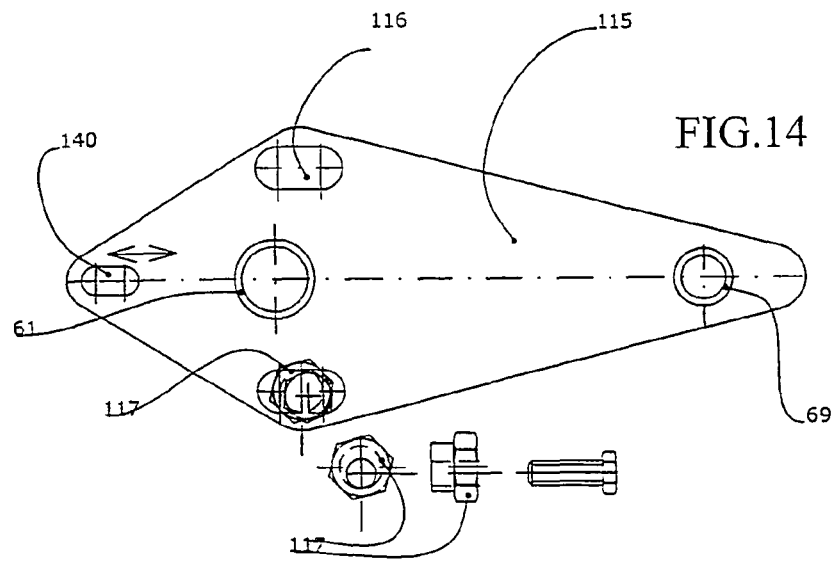
FIG. 14 shows in plan a supporting plate of the mechanism of FIG. 13, with an exploded view of a nut and a side view of nut and bolt.

As shown in FIG. 14, two eccentric bushes 117 are inserted in the slots 116 of the plate 115. This system permits the horizontal and vertical traverse of the plate 115, thus modifying the engagement point between the toothed sector 120 and the cogwheels 123 and 125.

Figures 6, 7, 8:
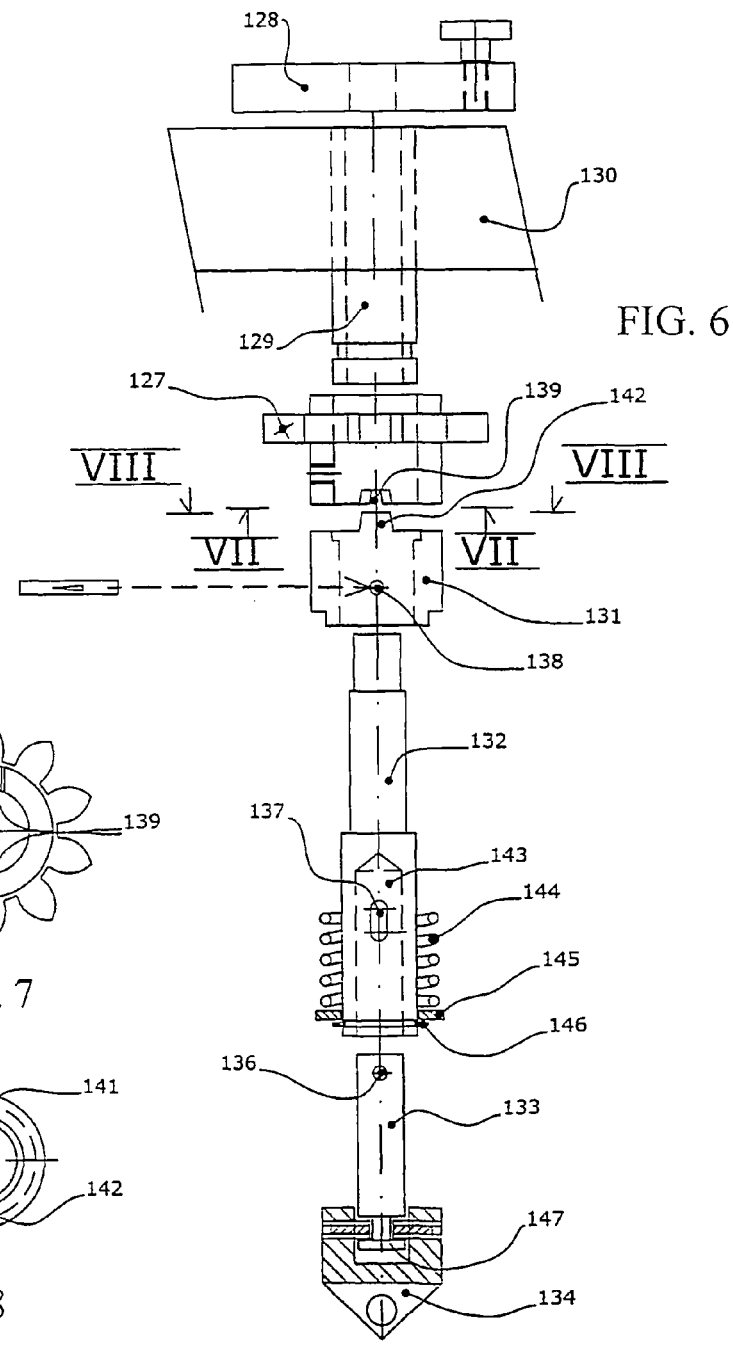
FIG. 6 is an exploded front view partially in section illustrating a release and coupling system to operate the pasta distributor.
FIG. 7 is a view in plan according to plan VII-VII of FIG. 6, illustrating a gear with cogwheel.
FIG. 8 is a view in plan according to plan VIII-VIII of FIG. 6 illustrating a movable bush.

A toothed pinion 127 which is engaged with the cogwheel 123 and has with respect to same a ratio Z1/Z2=½ is inserted on a hollow shaft 129 (FIG. 6) keyed to the body 130. The toothed pinion 127 frontally contains two trapezoidal seats 139 of different size. This toothed pinion 127 is prearranged to drive the measuring device through the second crank 30, the connecting rod 31, the crank 128 and a coupling and release device.

The coupling and release device is formed by the following elements:

A movable bush 131, with two front teeth 142-141 suitable for insertion in the trapezoidal seats 139 and with a cylindrical slot 138;

a hollow shaft 129, keyed to the body 130, which receives the toothed pinion 127 and the shaft 132;

a shaft 132 with an oval slot 137 and a cylindrical hollow 143.

On the shaft 132 are inserted a spring 144, with supporting washer 145 and stop washer 146, a cylindrical pin 133 with a mushroom head 147 and a cylindrical slot 136, and a tie rod 134.

The device is assembled by inserting the pin 133 in the hollow 143 and then coupling the shaft 132 in the connecting bush 131 and in the hollow shaft 129 on which the toothed pin 127 has already been inserted. On the end emerging from the shaft 132 the crank 128 is blocked. In the slots 138-137-136 the plug 135 is inserted which remains fixed to the pin 133; in this way the bush 131 remains fixed to the shaft 132 in the rotary movement but can move itself axially as far as conceded by the slot 137.

With the device at rest the bush 132 is coupled with the pinion 127 under the thrust of the spring 144; in this way the rotation of the cogwheel 123 and of the pinion 127 is transmitted to the crank 128. Axially driving the tie rod 134 and consequently the pin 133 with the relevant plug 135 and overcoming the thrust of the spring 144 disconnects the bush 131 from the pinion 127. (The re-coupling may usefully take place only after a rotation of 360°). In this state the gearing 127 no longer rotates the shaft 132 and the crank 128. The release of the measuring device of the drive mechanism is thus obtained.

This makes it possible to perform operative cycles without inserting pasta in the cooking chamber, thus "washing" the cooking and expansion chambers. The operation may be programmed at start-up and at stop of the equipment as required.

Figure 13:
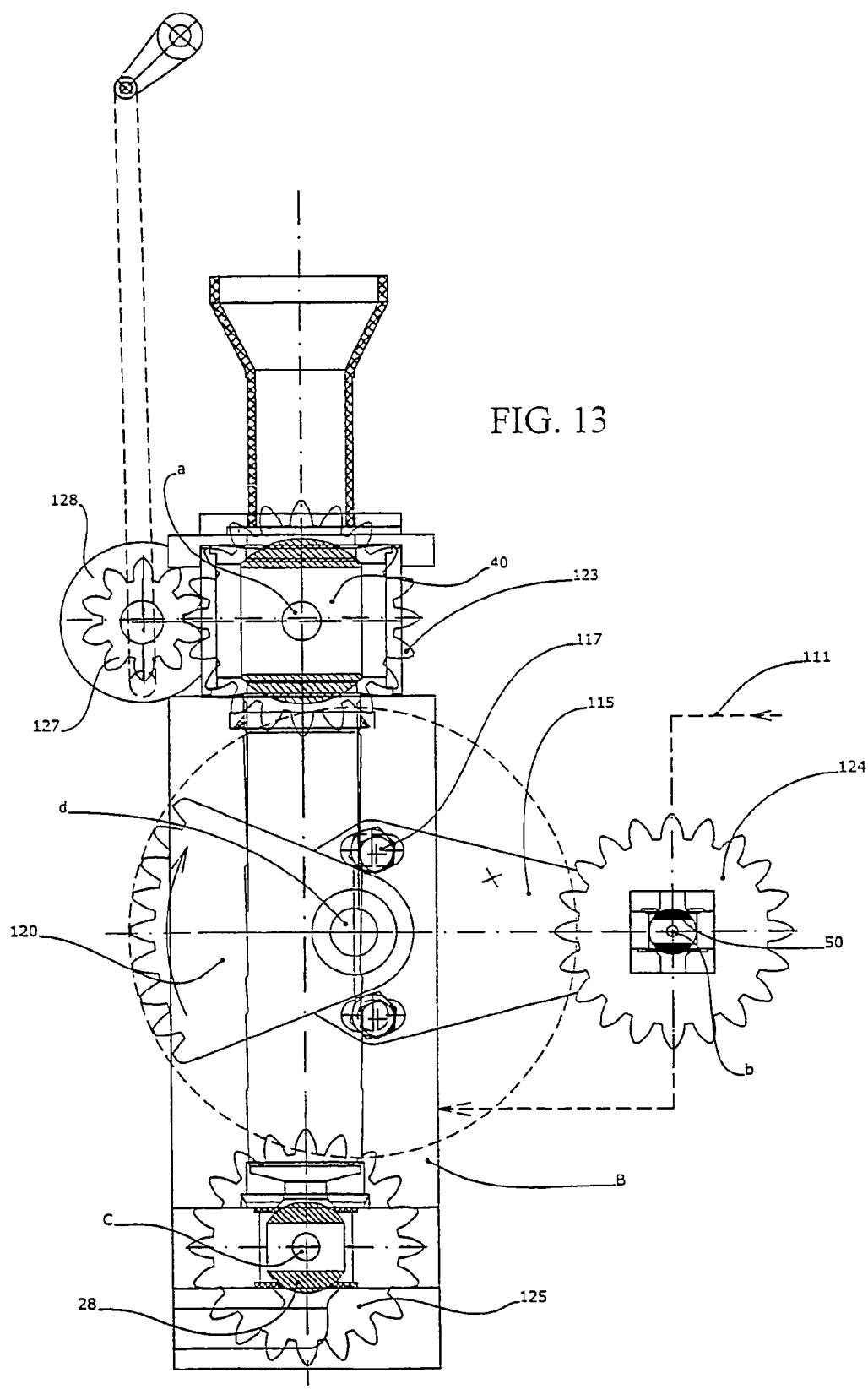
FIG. 13 is a front view, partially in section, illustrating a mechanism for the setting in action of the intercepting organs of the machine.

The drive system is shown in the rest and starting position in FIG. 13, the valves 40-28-50 are closed and the measuring device is in rest position.

Figure 17:
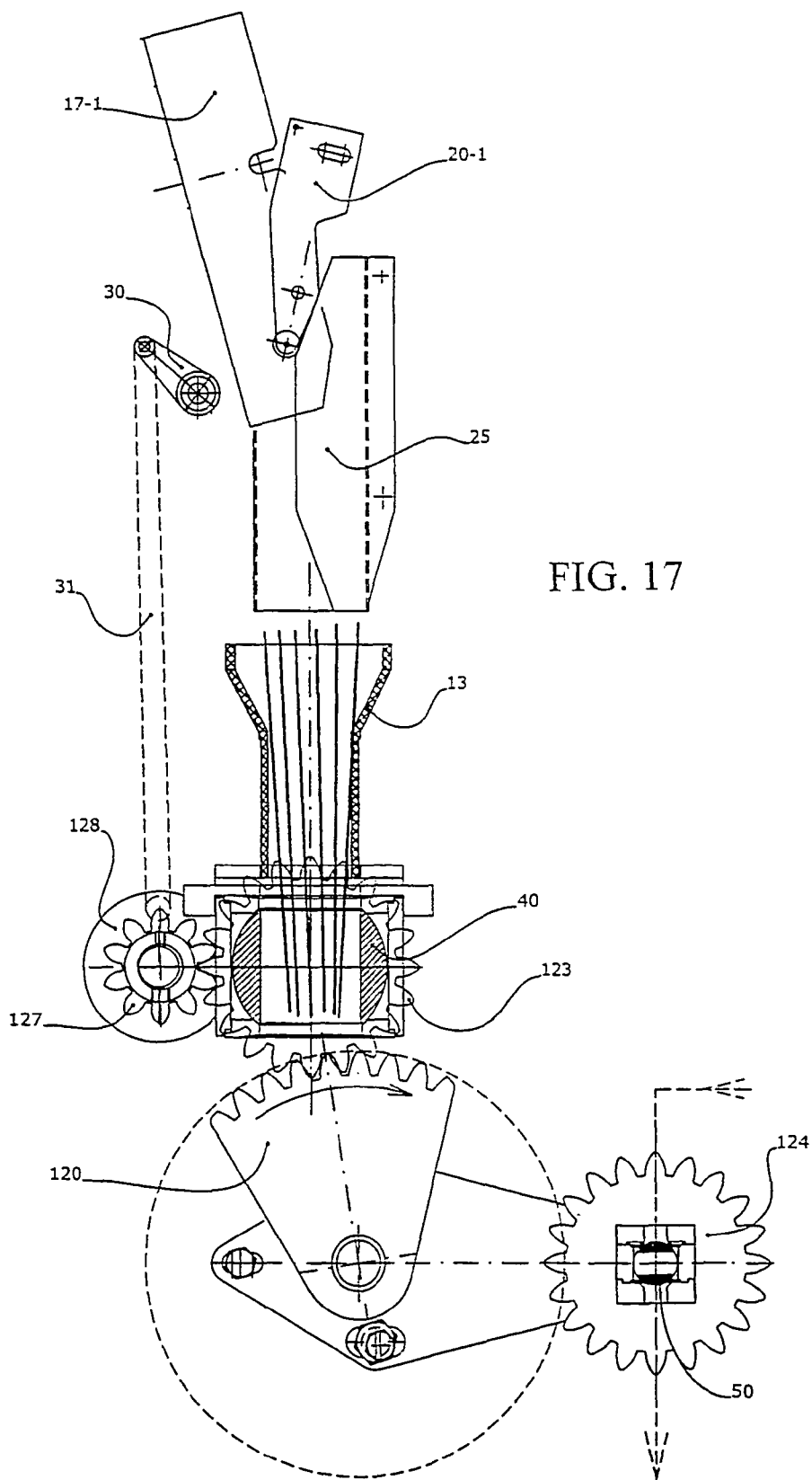

FIG. 17 shows the system in the next phase, the toothed sector 120 has made a rotation of 90° engaging with the cogwheel 123. The box batcher 17 of the measuring device has positioned itself vertically freeing the measured batch of pasta. The valve 40 has opened permitting the fall of the food into the cooking chamber.

The next phase is shown in FIG. 18 where the toothed sector 120 has made a further rotation of 90°. The valve 40 has re-closed; the toothed pinion 127 has completed a rotation of 360° and the box batcher of the measuring device has returned to starting position; the cogwheel 124 has made a rotation of 90°; the valve 50 has opened inserting the steam in the cooking chamber through the ducts 111-112-113.

After a prefixed pre-cooking time, the toothed sector 120 makes a further rotation of 90° (FIG. 19); the valve 50 re-closes; the valve 28 opens causing the emission of the food present in the cooking chamber B which settles in the expansion chamber C. At this point the system returns to the starting position (FIG. 13). The operation of the lid 62 takes place independently, after a prefixed time.

The machine also includes a microprocessor which controls the whole activity of the system. The microprocessor detects:

- the position of each moving organ, such as the valves 40, 28, 50, the box batcher of the measuring device 17, the dish seat, the lid 62 of the expansion chamber,
- the regularity of the state of the pressure in network, of the temperature in boiler E, of the descent of the spaghetti into the cooking chamber, of the batch formed, of the reserve of spaghetti, of the presence of the dish 76, of the withdrawal of the dish,
- any functional irregularities caused by blackouts, manual operative errors, mechanical problems.

The microprocessor, autonomously or through the operation, of special push-buttons, provides for the initial filling of the boiler E, for the performance of washing cycles of the system, to prepare the machine in the state which permits the inspection of the cooking chamber C and expansion chamber C, for the performance of test and acceptance test manoeuvres.

The microprocessor with special display informs the operator of the state of the machine, of any faults found, of the value of the parameters set and found, on the operations to be carried out to restore the functionality of the system in case of disorders.

The invention claimed is:

1. An apparatus for rapid cooking of edible pasta comprising:
   - delivering means for delivering a predetermined amount of pasta and comprising a measuring device, which measures a predetermined amount of pasta to be cooked and comprises a hopper coupled with a container extractable from the hopper, the container receiving industrial packages of pasta and supplying the pasta from the industrial packages to the hopper, to prevent the manual handling of the pasta;
   - a boiler which delivers high temperature pressurized water for cooking the pasta;
   - a cooking chamber which receives the measured predetermined amount of pasta from the delivering means and the high temperature pressurized water from the boiler via a connecting duct; and
   - an expansion chamber, which is connected to said cooking chamber through an admission duct, and delivers cooked pasta to a removable dish therebelow, the expansion chamber comprising:
     - an outlet disposed at a lower portion of the expansion chamber, and
     - a gasket, which is disposed around a lower edge of the lower portion of the expansion chamber and comprises a lip extending downwardly away from the expansion chamber, wherein the lip adheres against an internal surface of the removable dish and seals the removable dish to the outlet of the expansion chamber for the sealed removable dish to accept the cooked pasta from the outlet of the expansion chamber.

2. An apparatus as claimed in claim 1, wherein said hopper comprises a movable bottom for evenly delivering said predetermined amount of pasta, and said measuring device further comprises:
   - detection means for checking weight and volume of said predetermined amount of pasta,
   - a measuring drawer which accepts said predetermined amount of pasta and
   - a press sheet which retains the predetermined amount of pasta in said measuring drawer and releases the predetermined amount of pasta when vertically aligned with a descent channel, and said apparatus further comprising:
   - an inlet valve to the cooking chamber which is opened synchronously with the operation of said measuring drawer,
   - a remotely controlled device to release the synchronization between said inlet valve of the cooking chamber and said measuring drawer.

3. An apparatus as claimed in claim 1, wherein said apparatus further comprises:
   - a pump which pumps said high temperature pressurized water from the boiler into said cooking chamber and compresses the high temperature pressurized water to a pressure higher than vapour pressure of the superheated vapour,
   - an unloading valve placed at the top of said boiler to be opened for eliminating any steam that has formed, when the pressure of the water exceeds the pressure of the superheated vapour,
   - an outlet valve placed in said cooking chamber to be opened after the pasta has been heated for a predetermined time whereby the cooked pasta is transferred to said expansion chamber by means of a decompression generated upon opening of said outlet valve (28),
   - a silencing-noise-abating device placed on said expansion chamber and comprising a plurality of sectors arranged in succession.

4. An apparatus as claimed in claim 1, wherein the pasta is inserted into said expansion chamber and steered towards the bottom of the expansion chamber through a discharge duct placed tangent to a wall of the expansion chamber and with inclination towards the outlet of the expansion chamber, and the apparatus further comprises:
   - a drive device which inserts the removable dish into the gasket and removes and transfers the removable dish to the withdrawal position, and
   - a dish-moving device for allowing the insertion of said removable dish below said expansion chamber and the removal, said dish-moving device being coupled to the operation of a dish dispenser, a salt dispenser and of an external lid of dish insertion and to the operation of a dish decking plane.

5. An apparatus as claimed in claim 1, wherein said cooking chamber is kept at a constant temperature through a convection system with limited differential gradient obtained through the conformation of said boiler which feeds a convection jacket concentrical with said cooking chamber.

6. An apparatus as claimed in claim 1, wherein the walls of said cooking chamber are formed with reversed truncated cone-shaped sheets and said cooking chamber further includes:
   - a cup-shaped bottom of a non-sticking material,
   - two diffusion systems of the steam which assure a regular spraying from the top and from the bottom,
   - a drilled cylindrical tubular racket placed in contact with the bases of said truncated cone-shaped sectors so as to improve the heat exchange among the wall of said cooking chamber, the steam and the pasta being cooked and to accomplish a more effective emptying action,
   - the volume of said cooking chamber being such as to obtain in the expansion chamber an amount of steam corresponding to the amount which has to be absorbed by the pasta for their final softening.

7. An apparatus as claimed in claim 3, wherein said silencing-noise-abating device comprises:
- a labyrinth silencer formed by a cylindrical container through which the cold feed water flows, and on the perimeter of which round corrugated horseshoe-shaped sheets are placed, that are spaced from and facing to each other to form a succession of chambers having a decreasing volume and a tiled path for the steam;
- a tubular drum with slots placed at the top containing said round sheets, and
- an end tubular expansion drum with slots at the top, containing said horseshoe-shaped corrugated sheets, and
- an expansion tubular body, located outside the silencer and connected to a duct for discharging the steam.

8. An apparatus as claimed in claim 1, further comprising:
- a drive system equipped with gears, which mechanically fixes the position of cutting mechanisms, assures the operation of the correct cyclic succession, drives the different devices with a single geared motor and permits a precise definition of the angular positions of the inlet and outlet valves of said cooking chamber,
- a supporting plate on which a cogwheel and a toothed sector are mounted, in which said toothed sector rotates to engage two respective cogwheels connected with said inlet and outlet valves of the cooking chamber, to permit their opening/closure,
- coupling flanges that are mounted on said cogwheels for the angular adjustment to fit to changes the engagement point,
- a supporting plate having a variable position to allow a change of the centre distance of the arcs of access and withdrawal between the toothed sector and the cogwheels.

9. An apparatus as claimed in claim 1, wherein the pasta is contained within the industrial package,
  wherein said extractable container receives the industrial package of pasta while the pasta is still contained in the package.

10. An apparatus for rapid cooking of edible pasta comprising:
- a measuring device, which measures an amount of pasta to be cooked and comprises a hopper coupled with a container extractable from the hopper, the container receiving industrial packages of pasta and supplying the pasta from the industrial packages to the hopper, to prevent manual handling of the pasta;
- a boiler which delivers high temperature pressurized water for cooking the pasta;
- a cooking chamber which receives the measured amount of pasta from the measuring device and the high temperature pressurized water from the boiler via a connecting duct; and
- an expansion chamber, which is connected to said cooking chamber through an admission duct, and delivers the cooked pasta to a removable dish therebelow, the expansion chamber comprising:
  - an outlet disposed at a lower portion of the expansion chamber, and
  - a gasket, which is disposed around a lower edge of the lower portion of the expansion chamber and comprises a lip extending downwardly away from the expansion chamber, wherein the lip adheres against an internal surface of the removable dish and seals the removable dish to the outlet of the expansion chamber for the sealed removable dish to receive the cooked pasta from the outlet of the expansion chamber.

11. An apparatus as claimed in claim 10, wherein said hopper comprises a movable bottom for evenly delivering said measured amount of pasta,
  wherein said measuring device of pasta to be cooked comprises:
  - a detection device which checks weight and volume of said predetermined amount of pasta,
  - a measuring drawer which accepts said measured amount of pasta, and
  - a press sheet which retains the pasta in said measuring drawer and releases the pasta when vertically aligned with a descent channel,
  said apparatus further comprising:
  - an inlet valve to the cooking chamber which is opened synchronously with the operation of said measuring drawer; and
  - a remotely controlled device to release the synchronization between said inlet valve of the cooking chamber and said measuring drawer.

12. An apparatus as claimed in claim 10, wherein said apparatus further comprises:
- a pump which pumps said high temperature pressurized water from the boiler into said cooking chamber and compresses the high temperature pressurized water to a pressure higher than a vapour pressure of the superheated vapour,
- an unloading valve placed at the top of said boiler to be opened for eliminating any steam that has formed, when the pressure of the water exceeds the pressure of the superheated vapour,
- an outlet valve placed in said cooking chamber to be opened after the pasta has been heated for a predetermined time whereby the cooked pasta is transferred to said expansion chamber by a decompression generated upon opening of said outlet valve,
- a silencing-noise-abating device placed on said expansion chamber and comprising a plurality of sectors arranged in succession.

13. An apparatus as claimed in claim 10, wherein the pasta is contained within the industrial package, and
  wherein said extractable container receives the industrial package of pasta while the pasta is still contained in the package.

14. The apparatus as claimed in claim 1, wherein the hopper directly contacts the pasta as the pasta is fed directly from the industrial package of pasta into the hopper.

15. The apparatus as claimed in claim 10, wherein the hopper directly contacts the pasta as the pasta is fed directly from the industrial package of pasta into the hopper.

16. The apparatus as claimed in claim 1, further comprising:
- a duct through which pasta is fed into the expansion chamber, the duct being inclined downwardly toward the outlet of the expansion chamber.

17. The apparatus as claimed in claim 10, further comprising:
- a duct through which pasta is fed into the expansion chamber, the duct being inclined downwardly toward the outlet of the expansion chamber.

18. The apparatus as claimed in claim 1, wherein the pasta is delivered directly from the outlet of the expansion chamber into the removable dish, and
  the removable dish and the outlet of the expansion chamber are directly engaged to each other by the gasket in a sealed manner.

19. The apparatus as claimed in claim 10, wherein the pasta is delivered directly from the outlet of the expansion chamber into the removable dish, and
  the removable dish and outlet of the expansion chamber are directly engaged to each other by the gasket in a sealed manner.

20. The apparatus as claimed in claim 1, wherein the gasket further comprises a striker seat into which an upper edge of the removable dish is fitted, prior to the internal surface of the removable dish being sealed with the lip.

21. The apparatus as claimed in claim 20, wherein a diameter of the removable dish is approximately equal to a diameter of the outlet.

* * * * *